United States Patent [19]

Short, III et al.

[11] Patent Number: 5,005,722
[45] Date of Patent: Apr. 9, 1991

[54] FAIL SAFE RUPTURE DISK ASSEMBLY

[75] Inventors: Edward H. Short, III; Jim E. Ellis, both of Tulsa, Okla.

[73] Assignee: BS&B Safety Systems, Inc., Tulsa, Okla.

[21] Appl. No.: 610,972

[22] Filed: Nov. 7, 1990

[51] Int. Cl.$^5$ .............................. F16K 17/16
[52] U.S. Cl. ................... 220/89.1; 220/89.2; 137/68 R
[58] Field of Search ............. 220/89.1, 89.2; 137/68 R

[56] References Cited

U.S. PATENT DOCUMENTS

| | | | |
|---|---|---|---|
| 3,484,817 | 12/1969 | Wood | 220/89 |
| 3,834,580 | 9/1974 | Ludwig et al. | 137/68.1 X |
| 3,921,556 | 11/1975 | Wood et al. | 113/120 R |
| 4,211,334 | 7/1980 | Witten et al. | 220/89 A |
| 4,597,505 | 7/1986 | Mozley et al. | 137/68.1 X |
| 4,669,626 | 6/1987 | Mozley | 137/68.1 X |
| 4,759,460 | 7/1988 | Mozley | 220/89 A |

Primary Examiner—Steven M. Pollard
Attorney, Agent, or Firm—Laney, Dougherty, Hessin & Beavers

[57] ABSTRACT

The invention renders fail safe a rupture disk assembly consisting of inlet head, outlet head, and rupture disk secured therebetween, whenever the assembly is installed upside down. A fail safe relief notch is formed in the inlet head disk seating surface to cause premature bursting of the rupture disk when the assembly is improperly installed.

11 Claims, 1 Drawing Sheet

FAIL SAFE RUPTURE DISK ASSEMBLY

BACKGROUND OF THE INVENTION

1. Field of the Invention

The invention relates generally to rupture disk assemblies and, more particularly, but not by way of limitation, it relates to improved structure that renders the assembly fail safe in operation when the disk assembly is improperly installed, i.e., placed in operation in upside down attitude.

2. Description of the Prior Art

A number of different pressure relief devices of the rupture disk type have been developed and used heretofore. Generally, such devices include a rupture disk supported between a pair of support members or flanges which are, in turn, connected to a relief connection in a vessel or system containing fluid pressure. When the fluid pressure within the vessel or system exceeds the design rupture pressure of the disk, rupture occurs causing pressurized fluid to be relieved from the vessel or system.

Rupture disks of the reverse buckling type have also been developed and used successfully. Such disks include a domed portion and they are placed in operation so that the fluid pressure from the system is exerted against the convex side of the rupture disk. Upon failure, the domed portion of the disk buckles in reverse as it ruptures. Originally, all reverse buckling rupture disk assemblies required inclusion of a knife blade or the like to aid in disk rupture; however, more recent innovations have introduced the reverse buckling rupture disks that include scores placed in particular patterns or combinations of patterns on a surface of the disk thereby to create lines of weakness along which the disk will tear during failure. U.S. Pat. No. 3,484,817 exemplifies such structure, and a method of manufacturing scored reverse bucking rupture disks is described in U.S. Pat. No. 3,921,556.

Applicant is unaware of any prior teachings that relate to fail safe structure for inclusion with modular-type rupture disk assemblies that are capable of being installed improperly, and that will give erroneous protection limits unless such improper installation in detected. Thus, the present invention includes structure that will cause premature bursting in the event of improper installation.

SUMMARY OF THE INVENTION

The present invention relates to improvements in rupture disk assemblies and particularly those types of assemblies that employ scoring to form lines of weakness in the disk member. The rupture disk consists of an outer, annular rim merged into a domed central portion as retained between inlet and outlet head members, each of which has an annular seating surface formed about a central flow way. The disk outer rim is retained between the annular seating surfaces of the inlet and outlet head members and the dome portion convex side faces upstream in the flow way within the inlet head member. Clamping means retain the inlet and outlet heads in tight affixure and it is possible to get the head assembly installed upside down when placed in operation. To protect against this, a premature blow out is assured by formation of a notch about one-sixth of the way around the flow way periphery, as by removing a portion of the annular seating surface. When the module is reversed, pressure is allowed against a portion of the disk outer rim and the uneven pressure application tends to tear the rupture disk prematurely, failing at about one-half of its rated pressure.

Therefore, it is an object of the present invention to provide a fail safe burst disk assembly that only provides proper operation when installed in one attitude.

It is also an object of the present invention to provide a modular rupture disk assembly that offers positive operation and reliability.

Finally, it is an object of the invention to provide a rupture disk assembly that is fail safe in character leaving little room for improper operation and indication.

Other objects and advantages of the invention will be evident from the following detailed description when read in conjunction with the accompanying drawings which illustrate the invention.

DETAILED DESCRIPTION OF THE INVENTION

Figure 1:
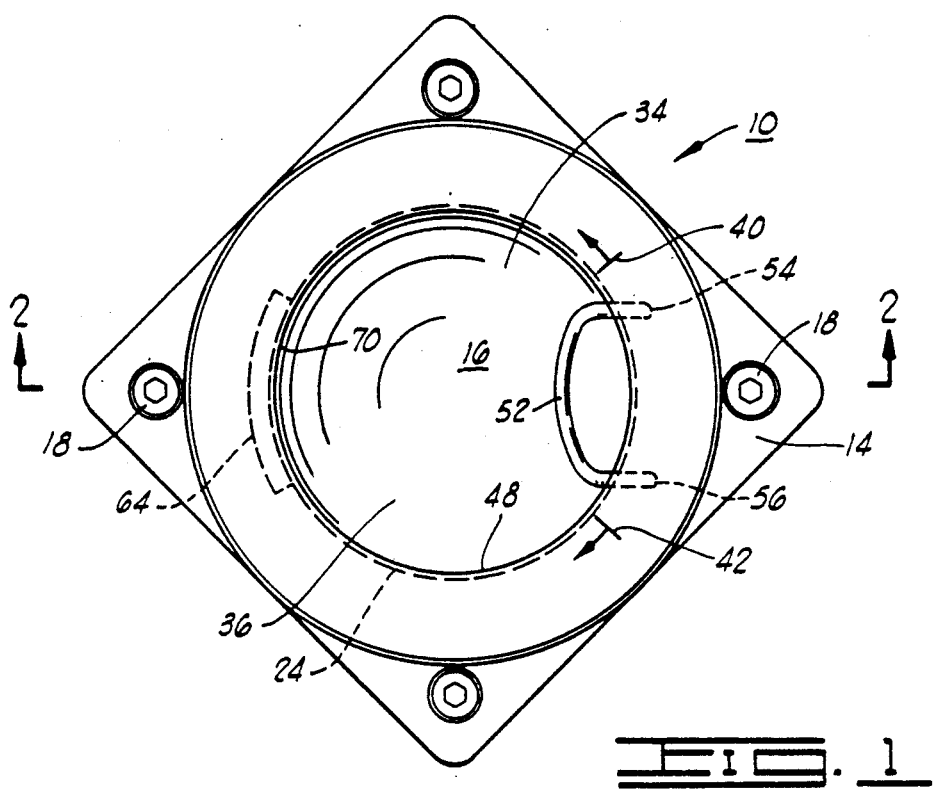
FIG. 1 is a top plan view of a rupture disk assembly with parts shown in dash-line.
Figure 2:
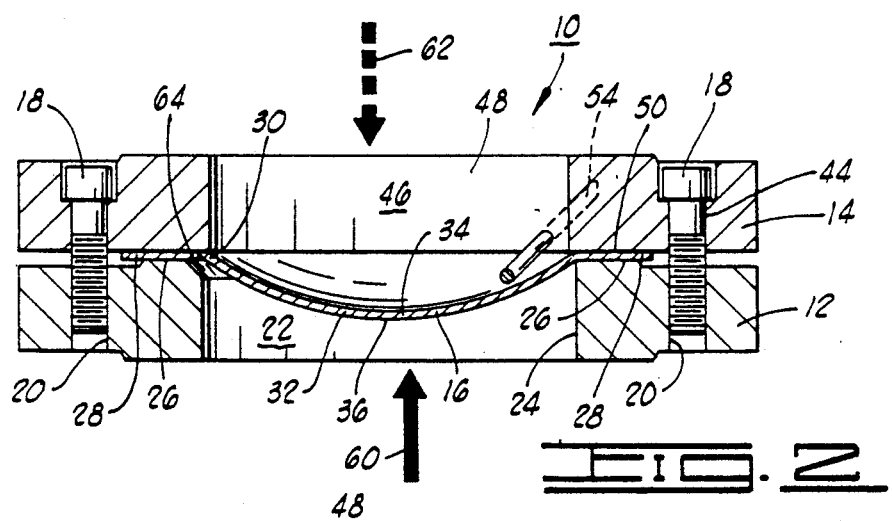
FIG. 2 is a vertical cross-section taken along lines 2—2 of FIG. 1.

Referring to FIGS. 1 and 2, a rupture disk assembly 10 consists of an inlet head 12 and an outlet head 14 securing a rupture disk 16 securely therebetween by means of a plurality of peripheral bolts 18. The rupture disk assembly 10 is a type known as a reverse buckling rupture disk and the general teachings are fully discussed in co-pending U.S. patent application Ser. No. 07/462,470 as filed on Jan. 9, 1990 and owned by the common assignee.

The inlet head 12 includes a plurality of peripheral threaded holes 20 while having a central flow way 22 as defined by a cylindrical wall 24. As shown in FIG. 2, an annular seating surface 26 is formed around the upper surface of inlet head 12 adjacent the cylindrical surface 24 and this provides a secure seat for tightly receiving the rupture disk 16.

Figure 3:
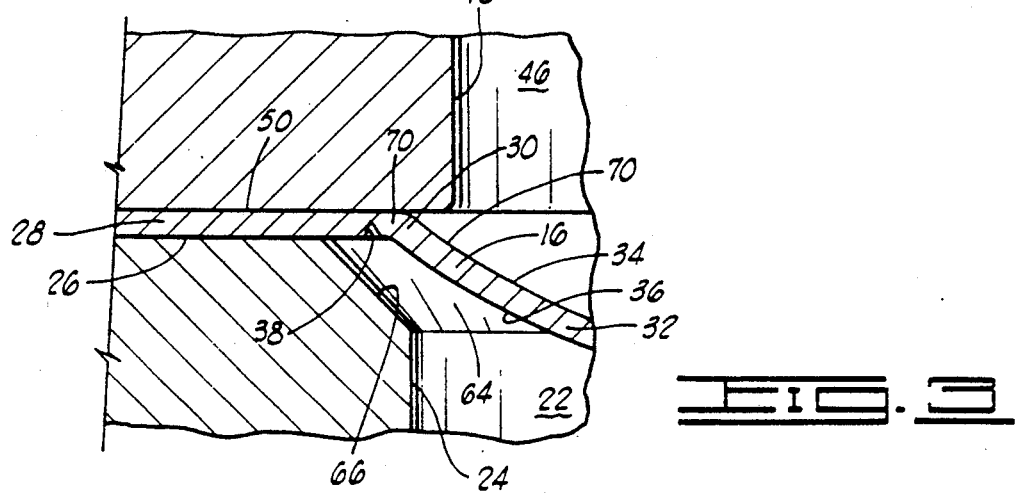
FIG. 3 is an enlargement of a portion of FIG. 2 showing the notch improvement.

The rupture disk 16 is formed to have an outer seating rim 28 which extends from seam 30 into a dome portion 32 having a concave surface 34 and a convex surface 36. See also FIG. 3 showing a portion of the disk structure in enlarged form. A line of weakness formed by a score 38 provides adjustable burst limits for the disk. In the particular example, the score 38 extends adjacent seam 30 in a C-shape from the radial lines 40 and 42 in the direction of the arrows (see FIG. 1). It should be understood too that the C-score 38 may be formed variously in or near disk seam 30 on either the convex side or the concave side of disk 16, such variations providing predictable adjustments in burst capability.

The outlet head 14 is formed with mating bolt holes 44 to define a central flow way 46 within a cylindrical wall 48. An annular seating surface 50 functions for positioning against the disk outer rim 28. A hinge member 52, about which the reverse bending disk folds upon bursting, is suitably secured as by force-fit of the end tabs 54 and 56 into the cylindrical wall 48.

As shown in FIG. 2, when the rupture disk assembly 10 is properly inserted in operation, the inlet head 12 and concave surface 36 of disk 16 face the high differential pressure as indicated by the major arrow 60. In some installations it is possible to get the rupture disk assembly 10 installed upside down in its seating arrangement such that the pressure source would be from the direction of dash-line arrow 62, and in this attitude the disk assembly 10 cannot be relied upon to give definable results. For this reason, a fail safe notch 64 is formed about a portion of inlet head seating surface 26, preferably about a one-sixth inside circumference portion, directly across from the creasing point of rupture disk 16, i.e., between score limits 40 and 42 (FIG. 1). Thus, about a 45° bevel 66 (FIG. 3) is formed about a one-sixth portion of the seating surface 26 or upper edge of cylindrical wall 24.

In operation, when the rupture disk assembly 10 is properly placed with the dome convex surface 36 directed toward the source of pressure 60, the fail safe notch 64 will have no effect on rupture disk 16. Disk 16 will function properly with the capability of bursting at its rated pressure differential as adjusted by the depth and angular divergence of the C-score 38. Should the rupture disk assembly 10 get positioned improperly with the concave surface 34 positioned toward the source of pressure 62, then the relatively small unsupported portion 70 (FIG. 3) of rupture disk 16 will buckle, tear at the score and fold up into flow way 22 and this will occur at much less than the rated pressure, approximately one-half of such pressure, so that the fail safe indication will have been given and a new, properly installed rupture disk assembly 10 can be placed in operation.

When the notched portion 64 is relieved, and pressure is applied in the wrong direction (dash arrow 62), a portion of the disk rim 70 is deformed and stress is concentrated in the adjacent section of the score 38. This then causes the score 38 to open at a relatively low pressure, approximately one-half of its rated normally installed pressure. It is important that the relieved portion or notch 64 be but some portion of the circumference because if the relief was uniform around the disk then much more pressure would be required to open it in the reverse direction, probably more than the reverse pressure rating. When relieved at about one-sixth of the circumference, the disk 16 opens at less than fifty percent of its burst rating. Since the disk 16 must withstand full vacuum, i.e., 14.7 PSID in the "wrong" direction, the relieved area should be sized so that it can withstand thousands of vacuum cycles without cracking the score.

While the foregoing description proceeded relative to the C-scored types of reverse buckling rupture disk assembly, it is well contemplated that the similar fail safe relief practices are equally applicable to rupture disks having other types of score pattern.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. A fail safe burst disk assembly comprising:
   inlet and outlet head members each defining a central flow way and having juxtaposed peripheral seating surfaces extending therefrom;
   a rupture disk formed as an outer portion for seating between said peripheral seating surfaces and a central domed portion having a concave surface and a convex surface that extends the convex surface into the flow way of the inlet head member;
   means for securing said inlet and outlet head members together; and
   a notch removing a portion of the inlet head seating surface adjacent the flow way for approximately one-sixth of the flow way periphery whereby the removal of support to the disk outer portion will cause disk failure at reduced pressures when the assembly is placed in operation upside down.

2. An assembly as set forth in claim 1 which is further characterized to include:
   a hinge member secured in the flow way of the outer head member and extending into and adjacent the concave surface of said rupture disk.

3. An assembly as set forth in claim 1 wherein:
   said rupture disk is C-scored approximately five-sixths of the distance around the central domed portion to provide a line of weakness that bursts at predetermined pressure.

4. An assembly as set forth in claim 3 which is further characterized in that:
   said peripheral seating surfaces of the inlet and outlet head members are annular shoulders adjacent a circular flow way.

5. An assembly as set forth in claim 1 which is further characterized in that:
   said peripheral seating surfaces of the inlet and outlet head members are annular shoulders adjacent the circular flow way.

6. An assembly as set forth in claim 1 wherein: said notch removes peripheral shoulder seating surface for the inner one-third of said peripheral seating surface which adjoins the flow way.

7. An assembly as set forth in claim 1 which is further characterized in that:
   said inlet head central flow way is a cylindrical wall; and
   said notch consists of an approximately forty-five degree bevel about one-sixth of said cylindrical wall to remove the juxtaposed peripheral seating surface.

8. A fail safe reverse buckling rupture disk module, comprising:
   inlet and outlet members each defining a flow way of similar diameter and each having an annular seating surface formed about said flow way;
   a reverse buckling rupture disk having an outer rim and a central dome having opposite convex and concave surfaces;
   means for securely clamping the rupture disk with the disk outer rim secured between the annular seating surfaces of the inlet and outlet members, and with the disk convex surface extending into the inlet member flow way; and
   notch means formed by removing a portion of the inlet member annular seating surface adjacent the disk central dome whereby the rupture disk will burst at reduced pressure in the event that it is wrongly placed in operation in reversed position.

9. A fail safe module as set forth in claim 8 which is further characterized in that:
   said notch means is formed by removing about one-sixth of the annular seating surface around the flow way.

10. A fail safe module as set forth in claim 8 which is further characterized in that:
    the rupture disk is C-scored around the periphery of the dome portion to leave about one-sixth of the disk unscored; and a burst hinge member secured within the outlet member flow way and extending into the dome portion adjacent the concave surface.

11. A fail safe module as set forth in claim 10 which is further characterized in that:

said notch means is formed by removing about one-sixth of the annular seating surface around the flow way and directly opposite to said burst hinge member and unscored disk.

* * * * *